(12) United States Patent
Van De Loosdrecht et al.

(10) Patent No.: US 8,394,864 B2
(45) Date of Patent: Mar. 12, 2013

(54) CATALYSTS

(75) Inventors: Jan Van De Loosdrecht, Sasolburg (ZA); Michael Steven Datt, Johannesburg (ZA); Jan Mattheus Botha, Sasolburg (ZA)

(73) Assignee: Sasol Technology (Proprietary) Limited (ZA)

( * ) Notice: Subject to any disclaimer, the term of this patent is extended or adjusted under 35 U.S.C. 154(b) by 239 days.

(21) Appl. No.: 12/937,491

(22) PCT Filed: Apr. 3, 2009

(86) PCT No.: PCT/IB2009/051407
§ 371 (c)(1),
(2), (4) Date: Oct. 12, 2010

(87) PCT Pub. No.: WO2009/127990
PCT Pub. Date: Oct. 22, 2009

(65) Prior Publication Data
US 2011/0028575 A1     Feb. 3, 2011

Related U.S. Application Data

(60) Provisional application No. 61/044,934, filed on Apr. 15, 2008.

(30) Foreign Application Priority Data

Apr. 15, 2008    (ZA) ................................ 2008/03339

(51) Int. Cl.
*C07C 1/04*      (2006.01)
*B01J 31/04*     (2006.01)

(52) U.S. Cl. ........................ 518/715; 502/150

(58) Field of Classification Search .................. None
See application file for complete search history.

(56) References Cited

U.S. PATENT DOCUMENTS 5,248,701 A     9/1993   Soled
(Continued)

FOREIGN PATENT DOCUMENTS

EP      0009976      9/1982
EP      0450861      7/1995
(Continued)

OTHER PUBLICATIONS

Matsuzaki, "Hydrogenation of carbon monoxide over highly dispersed cobalt catalysts derived from cobalt (II) acetate", "Catalysis Today", 1996, pp. 251-259, vol. 28, Published in: US.

(Continued)

*Primary Examiner* — Melvin C Mayes
*Assistant Examiner* — Stefanie Cohen
(74) *Attorney, Agent, or Firm* — Fellers, Snider, Blankenship, Bailey & Tippens, P.C.

(57) ABSTRACT

A process for preparing a cobalt based Fischer-Tropsch synthesis catalyst precursor includes introducing a multi-functional carboxylic acid having the general formula (1) HOOC—C*R$_1$C*R$_2$—COOH (1) or a precursor thereof, where C* in each of C*Ri and C*R2 is a sp$^2$ carbon, and R$_1$ and R$_2$ are the same or different, and are each selected from the group consisting of hydrogen and an organic group, into and/or onto a particulate catalyst support. The ratio of the quantity of multi¬functional carboxylic acid used relative to the support surface area is at least 0.3 μmol carboxylic acid/ m$^2$ of support surface area. Simultaneously with the introduction of the carboxylic acid into and/or onto the catalyst support, or subsequent thereto, a cobalt compound is introduced into and/or onto the catalyst support. The impregnated support is calcined to obtain the cobalt based Fischer-Tropsch synthesis catalyst precursor.

20 Claims, 1 Drawing Sheet

U.S. PATENT DOCUMENTS

| | | | |
|---|---|---|---|
| 5,733,839 A | 3/1998 | Espinoza | |
| 5,856,260 A | 1/1999 | Mauldin | |
| 5,945,459 A * | 8/1999 | Mauldin | 518/715 |
| 6,136,868 A | 10/2000 | Culross | |
| 6,385,690 B1 | 5/2002 | Iida | |
| 6,455,462 B2 | 9/2002 | Van Berge | |
| 6,638,889 B1 | 10/2003 | Van Berge | |
| 6,806,226 B2 | 10/2004 | Van Berge | |
| 6,835,690 B2 | 12/2004 | Van Berge | |
| 2003/0144130 A1 | 7/2003 | Clark | |
| 2004/0186188 A1 | 9/2004 | Van Berge | |

FOREIGN PATENT DOCUMENTS

| | | |
|---|---|---|
| EP | 1119411 | 6/2003 |
| EP | 1432778 | 9/2006 |
| EP | 1875962 | 1/2008 |
| WO | WO9942214 | 8/1999 |
| WO | WO0020116 | 4/2000 |
| WO | WO 0139882 A1 | 6/2001 |
| WO | WO0176734 | 10/2001 |
| WO | WO03004153 | 1/2003 |
| WO | WO03012008 | 2/2003 |
| WO | WO2008135939 | 11/2008 |
| WO | WO2009127990 | 10/2009 |
| ZA | 20012782 | 4/2001 |

OTHER PUBLICATIONS

International Search Report for PCT/IB2009/051407, dated Sep. 30, 2009.

Written Opinion for PCT/IB2009/051407, dated Sep. 30, 2009.

International Preliminary Report for PCT/IB2009/051407, dated Jul. 26, 2010.

* cited by examiner

CATALYSTS

THIS INVENTION relates to catalysts. It relates in particular to a process for preparing a cobalt based Fischer-Tropsch synthesis catalyst precursor, to a process for preparing a Fischer-Tropsch synthesis catalyst, and to a process for producing hydrocarbons which includes using the Fischer-Tropsch synthesis catalyst.

The Applicant is aware that supported cobalt based Fischer-Tropsch synthesis (FTS) catalysts can be synthesized by means of impregnation of a cobalt salt onto a support, coupled with drying of the impregnated support, followed by calcination of the resultant impregnated support, to obtain a FTS catalyst precursor, and then reducing the precursor to obtain the FTS catalysts. These cobalt FTS catalysts thus contain dispersed cobalt, including cobalt crystallites U.S. Pat. No. 5,945,459 describes the use of multi-functional carboxylic acids during impregnation and preparation of cobalt FTS catalysts wherein the multi-functional carboxylic acid is characterized as having the formula $$HOOC-(CRR^1)_n-COOH$$

with C being a sp$^3$ carbon atom and n=1-4. Examples of these multi-functional carboxylic acids are malonic acid, aspartic acid, succinic acid and citric acid. The application of these carboxylic acids permits much less rhenium to be used as promoter while still providing catalysts with a high active metal dispersion and high activity.

U.S. Pat. No. 6,136,868 deals with the co-impregnation of a support with active metals and carbohydrates or sugars, characterized as monosaccharide or disaccharide, with the aim of obtaining a high active metal dispersion and high activity. The co-impregnation of the carbohydrates or sugars again permits much lower levels of the rhenium noble metal promoter to be used.

U.S. Pat. No. 5,856,260 describes the co-impregnation of a support with active metals and a polyol or polyhydric alcohol with the aim of achieving a high active metal dispersion and activity. The co-impregnation of polyols or polyhydric alcohols also permits lower rhenium promoter levels to be used, as is the case in U.S. Pat. No. 6,136,868 and U.S. Pat. No. 5,945,459. Preferably, the polyols have the formula $$HOCH_2-(CHOH)_n-CH_2OH$$

with all carbons atoms being sp$^3$ carbon atoms and n preferably being 2-4.

U.S. Pat. No. 5,248,701 describes the preparation of unsupported mixed cobalt manganese FTS catalysts by means of co-impregnation with cobalt and an alpha-hydroxy carboxylic acid followed by calcination to form the mixed cobalt manganese spinel. The alpha-hydroxy carboxylic acid contains one or more hydroxy groups (OH). Using these alpha-hydroxy carboxylic acids improves the surface area of the spinel and a substantially homogeneous mixed phase.

WO 01/76734 describes the sequential impregnation of an alpha-hydroxy carboxylic acid and an active metal, followed by calcination. Suitable alpha-hydroxy carboxylic acids are citric, glycolic, malic, glyceric, and tartaric acid. All these carboxylic acids contain a hydroxy group. The aim is to obtain a macroscopic homogeneous distribution, which improves selectivity and/or activity and minimize attrition or less of active metal.

WO 03/004153 discloses the addition of surfactants, preferably non-ionic surfactants, to the active metal containing impregnation solutions that are used to impregnate a support, with the aim of making a FTS catalyst of high activity. The non-ionic surfactants may be polyoxyethylenated alkylphenols, polyoxyethylenated alkylphenol ethoxylates, and the like. When the surfactant is cationic, suitable surfactants include quarternary long-chain organic amine salts, quarternary polyethylenated long-chain organic amine salts, and the like.

It is an object of this invention to provide a FTS catalyst having an enhanced cobalt dispersion, resulting in improved catalytic performance. This object is achieved when the catalyst is prepared in accordance with the process of the invention.

Thus, according to a first aspect of the invention, there is provided a process for preparing a cobalt based Fischer-Tropsch synthesis catalyst precursor, which process includes introducing a multi-functional carboxylic acid having the general formula (1)

$$HOOC-C^*R_1C^*R_2-COOH \qquad (1)$$

or a precursor thereof, where
C* in each of C*R$_1$ and C*R$_2$ is a sp$^2$ carbon, and
R$_1$ and R$_2$ are the same or different, and are each selected from the group consisting of hydrogen and an organic group, into and/or onto a particulate catalyst support, with the ratio of the quantity of multi-functional carboxylic acid used relative to the support surface area being at least 0.3 µmol carboxylic acid/m$^2$ of support surface area;

simultaneously with the introduction of the carboxylic acid into and/or onto the catalyst support, or subsequent thereto, introducing a cobalt compound into and/or onto the catalyst support; and calcining the impregnated support to obtain the cobalt based Fischer-Tropsch synthesis catalyst precursor.

The introduction of the carboxylic acid onto and/or into the catalyst support may be by impregnation. The introduction of the cobalt compound into and/or onto the catalyst support may also be by impregnation.

It is to be appreciated that the introduction of the carboxylic acid according to formula (1) into and/or onto the catalyst support may be effected simultaneously with the introduction of the cobalt compound into and/or onto the catalyst support. When the introduction of the carboxylic acid and the introduction of the cobalt compound are by way of impregnation, the impregnation of the support with the carboxylic acid will thus be effected simultaneously with impregnation of the support with the cobalt compound. A common carrier liquid or solvent is then preferably used. The support may be a modified support containing an inorganic modifying agent as hereinafter described.

It was surprisingly found that when the resultant FTS catalyst precursor is converted to a FTS catalyst by means of reduction, the catalyst has high FTS activity. It was further surprisingly found that by using a carboxylic acid having the formula (1), a high degree of cobalt (metal and/or oxides) dispersion and activity is obtained in the catalyst, even when using low dosage ratios of carboxylic acid to support surface area, as hereinbefore specified. Furthermore, the use of lower dosage levels of organic acid will result in a decrease of the exothermic reaction observed during the calcination of the dried catalyst, due to oxidation of the organic acid.

Thus, while the ratio of the quantity of carboxylic acid used relative to the support surface area must be at least 0.3 µmol carboxylic acid/m$^2$ of support surface area as hereinbefore set out, the Applicant has found that the maximum quantity of carboxylic acid used relative to the support surface area can normally be limited to 10 µmol carboxylic acid/m$^2$ of support surface area. Thus, the quantity of carboxylic acid used relative to the support surface area may be in the range 0.3-10

µmol carboxylic acid/m² of support surface area, preferably 0.3-4.4 µmol carboxylic acid/m² of support surface area, more preferably 0.3-3.75 µmol carboxylic acid/m² of support surface area. Still more particularly, the ratio of the quantity of carboxylic acid used relative to the support surface area may be from 1.25-3.75 µmol carboxylic acid/m² of support surface area.

The support may be an unmodified support, ie a support containing no inorganic modifying agent. However, instead, the support may be a modified support containing an inorganic modifying agent. The inorganic modifying agent may, in particular, be an element of the Periodic Table of Elements that increases the inertness of the catalyst support towards dissolution in an aqueous environment during cobalt impregnation or towards hydrothermal attack during Fischer-Tropsch synthesis, and/or it may be an element of the Periodic Table of Elements that modifies the pore volume of the support.

Thus, the inorganic modifying agent may be selected from the group consisting in Si, Co, Ce, Cu, Zn, Ba, Ni, Na, K, Ca, Sn, Cr, Fe, Li, Tl, Sr, Ga, Sb, V, Hf, Th, Ge, U, Nb, Ta, W, La, Zr and Zn and mixtures thereof. In one preferred embodiment of the invention the inorganic modifying agent may be Si.

The catalyst support may be alumina ($Al_2O_3$), titania ($TiO_2$), silica ($SiO_2$), magnesia (MgO), silica-alumina, or mixtures thereof. Silica-alumina is preferred and preferably it has a silica content of less than 10 wt %.

The support surface area can be determined by means of a standard BET analysis.

In respect of the carboxylic acid, R1 and R2 are preferably each selected from the group consisting of hydrogen and a hydrocarbon. Preferably, the hydrocarbon is an alkyl. More particularly, the alkyl may be one having not more than six carbon atoms, preferably one having not more than three carbon atoms. In a preferred embodiment of the invention, the alkyl may be methyl.

In one version of the invention, at least one of R1 or R2 may be hydrogen. In one embodiment of the invention, both R1 and R2 may then be hydrogen. In an alternative embodiment, R1 may be hydrogen while R2 may be an alkyl, preferably methyl.

In one embodiment of the invention the C* atoms may be bound to each other by means of a double bond. R1 and R2 may then be located trans relative to each other. Alternatively, however, R1 and R2 may be located cis relative to each other.

In principle, any multi-functional carboxylic acid complying with formula (1) can be used, or a precursor thereof such as an anhydride. Non-limiting examples of suitable carboxylic acids are maleic acid, mesaconic acid, citraconic acid, and fumaric acid. An example of a suitable acid precursor is maleic anhydride. Mixtures of acids of formula (1) or precursors thereof may also be used, as may mixtures of acids of formula (1) or precursors thereof with acids, or precursors thereof, which do not comply with formula (1).

The catalyst support may also be impregnated with a reduction promoter. The reduction promoter may be Pt, Pd or Ru, or mixtures thereof. Impregnation of the reduction promoter may take place simultaneously with the introduction of the carboxylic acid into and/or onto the catalyst support and/or simultaneously with the impregnation of the support with the cobalt compound.

The process may also include the step of drying the carboxylic acid containing support. The drying may take place prior to impregnation of the support with the cobalt compound.

The cobalt compound may be a cobalt salt. The cobalt salt may, in particular, be cobalt nitrate, more preferably Co$(NO_3)_2.6H_2O$.

The cobalt compound may be impregnated onto and/or into the support by means of the incipient wetness method. Alternatively, the cobalt compound may be impregnated onto an/or into the support by means of slurry impregnation.

The process may include the step of at least partially drying the support impregnated with the cobalt compound prior to calcining the impregnated support.

The catalyst precursor may be prepared by means of more than one, such as two, or even several, cobalt compound impregnation, drying and calcination steps. The carboxylic acid may then, in addition to being introduced during the first such impregnation, drying and calcination step as hereinbefore described, also be added during at least one, or during each, subsequent impregnation, drying and calcination step.

Generally, the impregnation with the cobalt compound may be effected at sub-atmospheric pressure. Preferably the drying of the support impregnated with the cobalt compound is effected at sub-atmospheric pressure.

More particularly, the impregnation of the support with the cobalt compound and the carboxylic acid and the at least partial drying, may be effected as follows:
in a first impregnation step, subjecting the catalyst support to treatment with a solution containing the cobalt compound and the carboxylic acid, at a temperature T1 where 40° C.≦T1≦95° C. and at a sub-atmospheric pressure P1 where P1 ranges from atmospheric pressure>P1≧5 kPa(a), such that impregnation of the catalyst support with the cobalt compound and the carboxylic acid and partial drying thereof occurs, thereby to obtain a partially dried impregnated catalyst support;
calcining the partially dried impregnated support;
in a second impregnation step, subjecting the calcined impregnated catalyst support to treatment with a solution containing the cobalt compound, at a temperature T1 where 40° C.≦T1≦95° C. and at a sub-atmospheric pressure P1 where P1 ranges from atmospheric pressure>P1≧5 kPa(a), such that impregnation of the modified catalyst support with the cobalt compound and partial drying thereof occurs, thereby to obtain a partially dried impregnated catalyst support; and
calcining the partially dried impregnated catalyst support.

The introduction of the carboxylic acid may additionally be effected during the second impregnation step and/or during a subsequent further impregnation step, as well as during the first impregnation step.

During either, or both, of the impregnation steps, the process may include adding a water soluble precursor salt of Pt, Pd, or Ru, or mixtures, thereof as a dopant capable of enhancing the reducibility of the catalyst precursor.

The calcination is typically effected in a fluidized bed, or in a rotary kiln. The maximum calcination temperature may be 200° C.-400° C., more preferably between 200° C.-300° C. More particularly, the calcination conditions may be selected such that substantially all reducible cobalt is present in a calcined state, to obtain the catalyst precursor.

When using fluidized bed calcination and using air as the fluidizing medium, the air space velocity during calcination of the catalyst precursor containing the multi-functional carboxylic acid of formula (1) (which may be maleic acid), or a precursor thereof, may be between 0.7 and 13.5 $m^3_n$/(kg Co$(NO_3)_2.6H_2O$)/hour, more preferably between 0.9 and 6.8 $m^3_n$/(kg Co$(NO_3)_2.6H_2O$)/hour, and most preferably between 4.1 and 6.8 $m^3_n$/(kg Co$(NO_3)_2.6H_2O$)/hour.

The heating rate during calcination of the catalyst precursor containing the multi-functional carboxylic acid of formula (1) (which may be maleic acid), or a precursor thereof, may be between 0.1 and 10° C./min, preferably between 0.5 and 5° C./min, most preferably between 0.8 and 3° C./min.

According to a second aspect of the invention, there is provided a process for preparing a Fischer-Tropsch synthesis catalyst, which includes reducing a catalyst precursor obtained by the process according to the first aspect of the invention, thereby to obtain the Fischer-Tropsch synthesis catalyst.

The catalyst precursor may be activated by reduction by contacting the catalyst precursor with pure hydrogen or with a gaseous mixture containing hydrogen at a temperature ranging from 250° C. to 550° C., preferably from about 300° C. to about 425° C., preferably for a period ranging from 0.5 hour to about 24 hours and preferably at a pressure ranging from ambient to about 40 atmospheres.

According to a third aspect of the invention, there is provided a process for producing hydrocarbons, which includes contacting a synthesis gas comprising hydrogen ($H_2$) and carbon monoxide (CO) at an elevated temperature between 180° C. ad 250° C. and an elevated pressure between 10 and 40 bar with a Fischer-Tropsch synthesis catalyst produced by the process of the second aspect of the invention, using a Fischer-Tropsch reaction of the hydrogen with the carbon monoxide.

The invention will now be described in more detail, with reference to the following non-limiting examples and with reference to the accompanying drawings (FIGS. 1 and 2), which show plots of $CO_3O_4$ crystallite size vs dosage of organic acid on a catalyst support for Catalysts 1 to 11 (FIG. 1) and Catalysts 14 to 22 (FIG. 2).

EXAMPLE 1

Preparation of Comparative Catalyst 1

Figure 1:
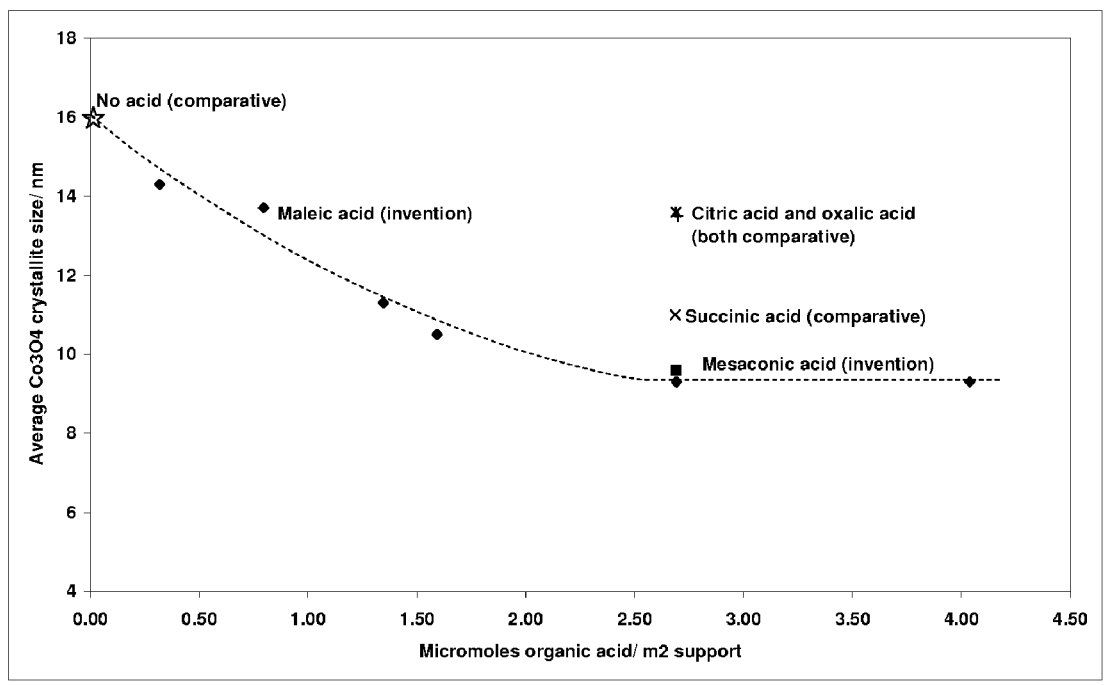
FIG. 1 is a plot of $CO_3O_4$ crystallite size versus dosage of organic acid on a catalyst support for Catalysts 1 to 11.

A 30 g Co/0.075 g Pt/100 g (1.5 g Si/100 g Puralox SCCa 2/150) slurry phase Fischer-Tropsch synthesis ("FTS") catalyst was prepared on a particulate modified 1.5 g Si/100 g Puralox SCCa 2/150 (trademark) pre-shaped support using aqueous slurry phase impregnation and drying, followed by direct fluidised bed calcination as disclosed generally in U.S. Pat. No. 5,733,839, U.S. Pat. No. 6,638,889 and U.S. Pat. No. 6,455,462, which are hence incorporated herein by reference. Puralox SCCa 2/150 is a pure pre-shaped gamma-alumina particulate catalyst support, and is prepared by calcination of boehmite. However, in this case the support had been modified, during manufacture thereof, so that it contained 1.5 g Si/100 g support. For this manufacture, the procedure used was as is described in example 1 of U.S. Pat. No. 6,638,889.

In particular, the catalyst was prepared as follows:
43.70 g $Co(NO_3)_2.6H_2O$ was dissolved in 40 ml distilled water, and 0.024 g of $Pt(NH_3)_4.(NO_3)_2$ (dissolved in 10 ml distilled water) was added to this solution in a 500 ml round ball flask in a rotorvapor at 60° C. and atmospheric pressure, where after 50.0 g of the 1.5 g Si/100 g Puralox SCCa 2/150 modified pre-shaped support was added to the solution. Aqueous slurry phase impregnation and vacuum drying was effected using the following procedure:

| Temperature of oil bath (° C.) | Rotorvapor pressure (mbar) (a) | Time (minutes) |
|---|---|---|
| 60 | Atmospheric | 10 |
| 60 | 260 | 30 |
| 70 | 260 | 90 |
| 85 | 260 | 60 |
| 85 | 50 | 240 |

This vacuum dried intermediate was directly subjected to a fluidized bed calcination step, according to the following procedure:
Continuous air flow of 1.7 $dm^3_n$/min, which is an air space velocity of 2.3 $m^3_n$/(kg $Co(NO_3)_2.6H_2O$)/hour
Temperature program:
From 25° C. to 250° C. at 1° C./min and keeping it at 250° C. for 6 hours 50.0 g of this intermediate calcined material was subjected to the following $2^{nd}$ cobalt/platinum impregnation and calcination step:
23.51 g $Co(NO_3)_2.6H_2O$ was dissolved in 40 ml distilled water and 0.039 g of $Pt(NH_3)_4.(NO_3)_2$ (dissolved in 10 ml distilled water) was added to this solution in a 500 ml round ball flask in a rotorvapor at 60° C. and atmospheric pressure, and 50.0 g of the ex $1^{st}$ cobalt/platinum impregnated and calcined intermediate was added. Aqueous slurry phase impregnation and vacuum drying was effected using the following procedure:

| Temperature of oil bath (° C.) | Rotorvapor pressure (mbar) (a) | Time (minutes) |
|---|---|---|
| 60 | Atmospheric | 10 |
| 60 | 260 | 30 |
| 70 | 260 | 90 |
| 85 | 260 | 60 |
| 85 | 50 | 240 |

This vacuum dried intermediate was directly subjected to a fluidized bed calcination step, according to the following procedure:
Continuous air flow of 1.7 $dm^3_n$/min which is an air space velocity of 4.3 $m^3_n$/(kg $Co(NO_3)_2.6H_2O$)/hour
Temperature program:
From 25° C. to 250° C. at 1° C./min and keeping it at 250° C. for 6 hours In preparation for laboratory scale slurry phase continuous stirred tank reactor ('CSTR') Fischer-Tropsch synthesis (FTS) runs, this calcined material was reduced and wax coated in accordance with the following procedure:
8.0 g of the catalyst was reduced at 1 bar in pure $H_2$ (space velocity=2.0$H_2$ $m^3_n$/(kg catalyst)/hour) whilst the temperature was increased from 25° C. to 425° C. at a rate of 1° C./min where after the temperature was kept constant at this temperature of 425° C. for 16 hours.

The reduced catalyst was allowed to cool down to room temperature at which stage the hydrogen was replaced by argon, and the catalyst unloaded in molten Fischer-Tropsch wax under the protection of an argon blanket. This wax coated catalyst was then transferred to the slurry reactor.

EXAMPLE 2

Preparation of Catalysts 2 to 10

Catalysts 2 to 10, all of the composition 30 g Co/0.075 g Pt/100 g (1.5 g Si/100 g Puralox SCCa 2/150), were prepared according to the procedure described in Example 1, except that a specified amount of a carboxylic acid, as identified in Table 1, was in each case added to the aqueous cobalt nitrate/ platinum nitrate solution during the first impregnation step (Table 1) prior to drying. No carboxylic acids were added during the second impregnation step. Catalysts 2-8 are in accordance with the invention. Catalysts 9 and 10 are comparative. The amounts of the respective acids added are shown in Table 1.

EXAMPLE 3

Preparation of Comparative Catalyst 11

Catalyst 11 was prepared according to the procedure described in Example 1, except that the silica modified alumina support was first modified with oxalic dihydrate prior to cobalt nitrate impregnation. The support was modified by mixing 2.72 g oxalic dihydrate with 50 g silica modified support in 100 ml water. The water was then evaporated under reduced pressure on a rotary evaporator to yield a free flowing powder. The organic modified support was then used as described in Example 1.

EXAMPLE 4

Preparation of Catalyst 12 in Accordance with the Invention

Catalyst 12 was prepared according to the procedure described in Example 2, except that the catalyst was calcined using a heating rate of 3° C./min during both the first and the second calcination.

EXAMPLE 5

Preparation of Catalyst 13 in Accordance with the Invention

Catalyst 13 was prepared according to the procedure described in Example 1, except that the silica modified alumina support was first modified with maleic acid prior to cobalt nitrate impregnation. The support was modified by mixing 2.5 g maleic acid with 50 g silica modified support in 100 ml water. The water was then evaporated under reduced pressure on a rotary evaporator to yield a free flowing powder. The organic modified support was then used as per example 1.

EXAMPLE 6

Preparation of Catalysts 14 to 22

Catalysts 14 to 22, all of the composition 16 g Co/0.025 g Pt/100 g (1.5 g Si/100 g Puralox SCCa 2/150), were prepared according to the procedure described in Example 1, except that a specified amount of a carboxylic acid, as identified in Table 2, was in each case added to the aqueous cobalt nitrate/ platinum nitrate solution during the first impregnation step prior to drying. The catalyst preparation was stopped after the first impregnation and calcination step, i.e. the second impregnation and calcination step was not executed. In this manner the cobalt loading was kept at 16 g Co/100 g $Al_2O_3$. The amounts of the respective acids added are shown in Table 2.

EXAMPLE 7

Preparation of Catalyst 23

Catalyst 23, of the composition 16 g Co/0.025 g Pt/100 g (1.5 g Si/100 g Puralox SCCa 2/150), was prepared according to the procedure described in Example 6, except that during calcination an airflow of 4.8 $dm^3_n$/min, which is an air space velocity of 6.5 $m^3_n$/(kg $Co(NO_3)_2.6H_2O$)/hour, was used (see Table 2).

Table 1: Amount of organic acid added during the first impregnation step in the preparation of a 30 g Co/0.075 g Pt/100 g support catalyst. The acid was only added during the first impregnation step and not in the second impregnation step.

| Catalyst number | Organic acid | Moles organic acid/100 g support | $Co_3O_4$ size/nm * | µmol organic acid/$m^2$ surface area support [#] | Organic acid (grams used)/ 50 g support |
|---|---|---|---|---|---|
| 1 (Comp) | — | 0 | 16.0 | 0 | 0 g |
| 2 | Maleic acid | 5.1 mmol | 14.3 | 0.32 | 0.30 g |
| 3 | Maleic acid | 12.8 mmol | 13.7 | 0.80 | 0.74 g |
| 4 | Maleic acid | 21.5 mmol | 11.3 | 1.35 | 1.25 g |
| 5 | Maleic acid | 25.5 mmol | 10.5 | 1.59 | 1.48 g |
| 6 | Maleic acid | 43.1 mmol | 9.3 | 2.69 | 2.50 g |
| 7 | Maleic acid | 64.6 mmol | 9.3 | 4.04 | 3.75 g |
| 8 | Mesaconic acid | 43.0 mmol | 9.6 | 2.69 | 2.80 g |
| 9 (Comp) | Succinic acid | 43.0 mmol | 11.0 | 2.69 | 2.54 g |
| 10 (Comp) | Citric acid | 43.0 mmol | 13.6 | 2.69 | 4.52 g |
| 11 (comp) | Oxalic acid | 43.2 mmol | 13.5 | 2.70 | 2.72 g |
| 12 | Maleic acid | 43.1 mmol | 11.1 | 2.69 | 2.50 g |
| 13 | Maleic acid | 43.1 mmol | 10.2 | 2.69 | 2.50 g |

* As determined by XRD analysis

[#] Surface area of support is 160 $m^2$/g as determined by means of a standard BET analysis.

Standard surface area measurements were performed in a Micromeritics Tristar 3000 instrument using $N_2$ adsorption. The measurements were performed at 77K. Approximately 0.25 g of samples were dried and degassed at 200° C. under a stream of nitrogen overnight prior to analysis. The surface area was calculated as the Brunauer-Emmett-Teller (BET) surface area.

Table 2: Amount of organic acid added during the first and only impregnation step in the preparation of a 16 g Co/0.025 g Pt/100 g support catalyst.

| Catalyst number) | Organic acid | Moles organic acid/100 g support | $Co_3O_4$ size/nm * | umol organic acid/$m^2$ surface area support # | Organic acid (grams used)/ 50 g support |
|---|---|---|---|---|---|
| 14 | Maleic acid | 5.1 mmol | 11.2 | 0.32 | 0.30 g |
| 15 | Maleic acid | 12.8 mmol | 10.4 | 0.80 | 0.74 g |
| 16 | Maleic acid | 21.5 mmol | 8.9 | 1.35 | 1.25 g |
| 17 | Maleic acid | 43.1 mmol | 7.6 | 2.69 | 2.50 g |
| 18 | Maleic acid | 64.6 | 7.6 | 4.04 | 3.75 g |
| 19 (Comp) | Citric acid 4, 82 | 43.0 mmol | 12.0 | 2.69 | 4.52 g |
| 20 (Comp) | Citric acid 10 | 95.2 mmol | 11.9 | 5.95 | 10.00 |
| 21 (Comp) | Tartaric acid | 33.3 mmol | 11.2 | 2.08 | 2.50 g |
| 22 (Comp)) | Tartaric acid | 50.0 mmol | 13.4 | 3.12 | 3.75 g |
| 23 | Maleic acid | 21.5 mmol | 7.5 | 2.69 | 1.25 g |

* As determined by XRD analysis
Support surface area is 160 $m^2$/g, as determined by means of a standard BET analysis.

The catalysts that were prepared were analyzed to determine their average $Co_3O_4$ crystallite sizes as a function of their carboxylic acid addition levels. This was done on a Philips X'Pert Pro multipurpose diffractometer.

Figure 2:
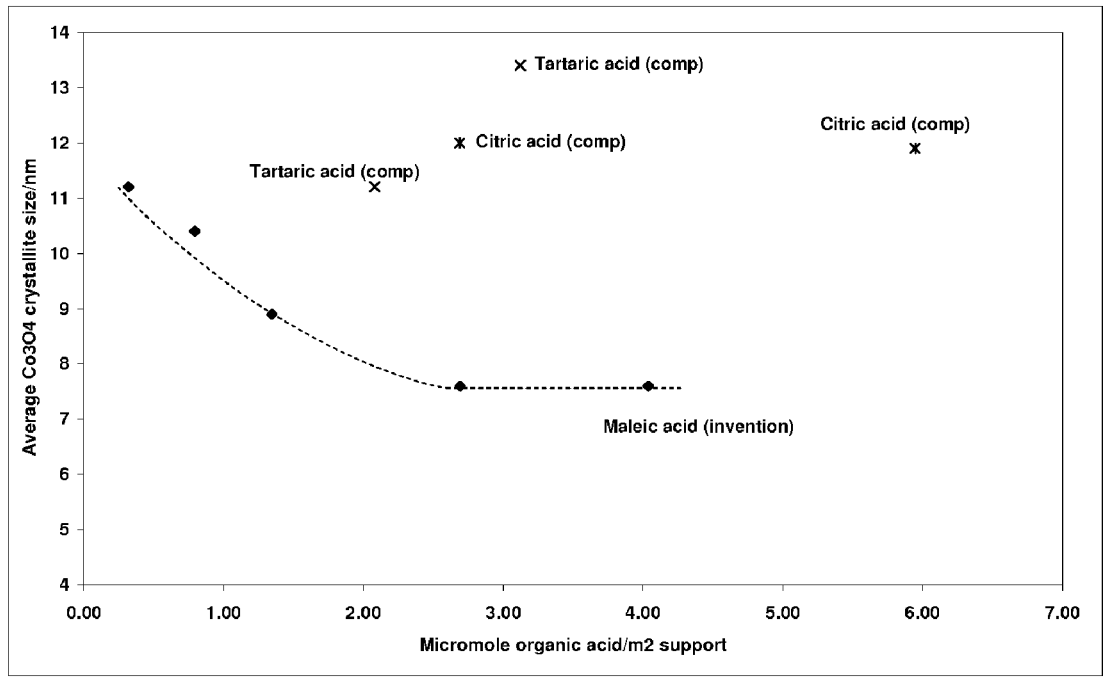
FIG. 2 is a plot of $CO_3O_4$ crystallite size versus dosage of organic acid on a catalyst support for Catalysts 14 to 22.

Average $Co_3O_4$ crystallite sizes (nm) of $Co_3O_4$ crystallites on the catalyst were determined by XRD and are plotted as a function of μmol organic acid/$m^2$ of support surface area in FIG. 1 and FIG. 2. In the drawings, the smaller the average $Co_3O_4$ crystallite size, the higher the degree of dispersion of the crystallites. An increase in dispersion and hence active metal surface area results in an increase in catalytic activity as demonstrated hereunder for Catalyst 5 and 6. The results are also given in Tables 1 and 2.

CSTR Fischer-Tropsch Synthesis Runs:

Slurry phase CSTR Fischer-Tropsch synthesis runs were performed on two of the organic acid modified catalysts of Example 2, ie Catalysts 5 and 6, and on the comparative catalyst of Example 1, ie Catalyst 1. The following Fischer-Tropsch synthesis reaction conditions were maintained:

| | |
|---|---|
| Reactor temperature | 230.0° C. |
| Reactor pressure | 17 bar |
| Catalyst inventory | ca. 6 gram |
| ($H_2$ + CO) conversion | 60% |
| $H_2$:CO inlet ratio | 1.9:1 |
| Argon internal standard | 12 vol % |

Catalysts 5 and 6, which were thus prepared in accordance with the invention using maleic acid as carboxylic acid (see Table 1) had an activity enhancement of 51% and 37% compared to the non-organic acid modified catalyst (Catalyst 1) after 6 days of FTS activity under the reaction conditions described above. Thus, the use of a carboxylic acid in accordance with formula (1) results in an increase in catalyst performance. The $Co_3O_4$ crystallite sizes of Catalysts 5 and 6, which were 10.5 nm and 9.3 nm respectively, were also significantly smaller than the $Co_3O_4$ crystallite size (16.0 nm) of Catalyst 1.

It is further clear from Tables 1 and 2 that when using multi-functional carboxylic acids having the general formula (1) and thus in accordance with the invention, the $Co_3O_4$ crystallite sizes are generally smaller than those of catalysts prepared using organic acids which do not comply with formula (1) and which are thus not according to the invention, when using the same mole amount of carboxylic acids per $m^2$ surface area support. Thus, for Catalysts 6 and 8, the crystallite sizes are 9.3 nm and 9.6 nm respectively, while for comparative Catalysts 9, 10 and 11 (produced using equivalent mole amounts of a carboxylic acid not complying with formula (1)) the crystallite sizes are significantly higher at 11.0 nm, 13.6 nm and 13.5 nm respectively. Catalysts 6 and 8 will thus have significantly higher activities than Catalysts 10, 11 and 12.

The invention claimed is:

1. A process for preparing a cobalt based Fischer-Tropsch synthesis catalyst precursor, which process includes
   introducing a multi-functional carboxylic acid having the general formula (I)

$$HOOC-C^*R_1C^*R_2-COOH \quad (1)$$

or a precursor thereof, where
   $C^*$ in each of $C^*R_1$ and $C^*R_2$ is a $sp^2$ carbon, and
   $R_1$ and $R_2$ are the same or different, and are each selected from the group consisting of hydrogen and an organic group,
   into and/or onto a particulate catalyst support, with the ratio of the quantity of multi-functional carboxylic acid used relative to the support surface area being at least 0.3 μmol carboxylic acid/$m^2$ of support surface area;
   simultaneously with the introduction of the carboxylic acid into and/or onto the catalyst support, or subsequent thereto, introducing a cobalt compound into and/or onto the catalyst support; and
   calcining the impregnated support to obtain the cobalt based Fischer-Tropsch synthesis catalyst precursor.

2. A process according to claim 1, wherein the introduction of the carboxylic acid and the cobalt compound into and/or onto the catalyst support is by way of impregnation.

3. A process according to claim 2, wherein the ratio of the quantity of carboxylic acid used relative to the support surface area is in the range 0.3-10 μmol carboxylic acid/$m^2$ of support surface area.

4. A process according to claim 3, wherein the ratio of the quantity of carboxylic acid used relative to the support surface area is 1.25-4.4 μmol carboxylic acid/$m^2$ of support surface area.

5. A process according to claim 2 wherein, in respect of the carboxylic acid, the organic group of the group from which $R_1$ and $R_2$ are selected, is a hydrocarbon.

6. A process according to claim 5 wherein, in respect of the carboxylic acid, the hydrocarbon of the group from which $R_1$ and $R_2$ are selected, is an alkyl.

7. A process according to claim 6 wherein, in respect of the carboxylic acid, the alkyl of the group from which $R_1$ and $R_2$ are selected, is methyl.

8. A process according to claim 2 wherein, in respect of the carboxylic acid, the C* atoms are bound to each other by means of a double bond.

9. A process according to claim 2, wherein the carboxylic acid is maleic acid.

10. A process according to claim 2, wherein the catalyst support is also impregnated with a reduction promoter, with the impregnation of the reduction promoter taking place simultaneously with the introduction of the carboxylic acid into and/or onto the catalyst support and/or simultaneously with the impregnation of the support with the cobalt compound.

11. A process according to claim 2, which includes the step of drying the carboxylic acid containing support prior to impregnation of the support with the cobalt compound.

12. A process according to claim 2, which includes the step of at least partially drying the support impregnated with the cobalt compound prior to calcining the impregnated support.

13. A process according to claim 12, wherein at least two successive cobalt compound impregnation, at least partial drying and calcination steps are employed.

14. A process according to claim 13, wherein the carboxylic acid is, in addition to being introduced during the first such impregnation, at least partial drying and calcination step, also added during at least one, or during each, subsequent impregnation, at least partial drying and calcination step.

15. A process according to claim 13, wherein the impregnation with the cobalt compound is effected at sub-atmospheric pressure, as is the at least partial drying of the support impregnated with the cobalt compound.

16. A process according to claim 1, wherein the calcination is effected in a fluidized bed at a temperature from 200° C. to 400° C. and using air as fluidizing medium.

17. A process according to claim 16 wherein, during the fluidized bed calcination the air space velocity is between 0.7 and 13.5 $m^3_n$/(kg $Co(NO_3)_2.6H_2O$)/hour.

18. A process according claim 1, wherein the heating rate during calcination is between 0.1 and 10° C./min.

19. A process for preparing a Fischer-Tropsch synthesis catalyst, which includes producing a catalyst precursor by the process according to claim 1, and reducing the catalyst precursor thereby to obtain the Fischer-Tropsch synthesis catalyst.

20. A process for producing hydrocarbons, which includes producing a Fischer-Tropsch synthesis catalyst according to claim 19 and contacting a synthesis gas comprising hydrogen (H2) and carbon monoxide (CO) at an elevated temperature between 180° C. ad 250° C. and an elevated pressure between 10 and 40 bar with the Fischer-Tropsch synthesis catalyst, using a Fischer-Tropsch reaction of the hydrogen with the carbon monoxide.

* * * * *